United States Patent
Neely, III et al.

(10) Patent No.: US 7,667,700 B1
(45) Date of Patent: Feb. 23, 2010

(54) SYSTEM AND METHOD FOR NAVIGATING OPERATING IN A VIRTUAL ENVIRONMENT

(75) Inventors: Howard Neely, III, Manhattan Beach, CA (US); Jason Fox, Thousand Oaks, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 582 days.

(21) Appl. No.: 11/074,496

(22) Filed: Mar. 7, 2005

Related U.S. Application Data

(60) Provisional application No. 60/550,808, filed on Mar. 5, 2004.

(51) Int. Cl.
*G06T 15/10* (2006.01)

(52) U.S. Cl. ............ 345/427; 345/419; 345/421; 345/473; 434/11

(58) Field of Classification Search ........... 345/419, 345/421, 427, 473
See application file for complete search history.

(56) References Cited

U.S. PATENT DOCUMENTS

| | | | |
|---|---|---|---|
| 3,739,347 A | 6/1973 | Forsberg | |
| 4,734,690 A | 3/1988 | Waller | |
| 4,847,605 A | 7/1989 | Callahan et al. | |
| 4,987,527 A | 1/1991 | Hamada et al. | |
| 5,019,809 A | 5/1991 | Chen | |
| 5,179,656 A | 1/1993 | Lisle | |
| 5,276,785 A | 1/1994 | Mackinlay et al. | |
| 5,315,313 A | 5/1994 | Shinagawa | |
| 5,319,747 A | 6/1994 | Gerrissen et al. | |
| 5,359,703 A | 10/1994 | Robertson et al. | |
| 5,689,628 A | 11/1997 | Robertson | |
| 5,714,698 A | 2/1998 | Tokioka et al. | |
| 5,742,263 A | 4/1998 | Wang et al. | |
| 5,808,613 A | 9/1998 | Marrin et al. | |
| 5,936,612 A | 8/1999 | Wang | |
| 6,009,210 A | 12/1999 | Kang | |
| 6,050,822 A * | 4/2000 | Faughn | 434/11 |
| 6,083,163 A * | 7/2000 | Wegner et al. | 600/429 |
| 6,111,582 A * | 8/2000 | Jenkins | 345/421 |
| 6,154,723 A | 11/2000 | Cox et al. | |
| 6,160,551 A | 12/2000 | Naughton et al. | |
| 6,281,877 B1 | 8/2001 | Fisher et al. | |
| 6,289,299 B1 | 9/2001 | Daniel, Jr. et al. | |
| 6,497,649 B2 | 12/2002 | Parker et al. | |
| 6,646,643 B2 * | 11/2003 | Templeman | 345/473 |

OTHER PUBLICATIONS

Feibush, E., N. Gagvani, and D. Williams. 2000. "Visualization for situational awareness". IEEE Computer Graphics and Applications. Sep./Oct. 2000. pp. 38-45.

(Continued)

*Primary Examiner*—Kimbinh T Nguyen
(74) *Attorney, Agent, or Firm*—Tope-McKay & Assoc.

(57) ABSTRACT

The present invention relates to a system, method and computer program product for navigating within a virtual environment (VE). More specifically, the present invention relates to navigating large distances in a VE, without becoming disoriented and without becoming cybersick due to exposure to excessive amounts of optical flow. In one embodiment, the present invention combines jumping and flying to allow for quick navigation of large distances, while preserving a sense of orientation and limiting optical flow.

24 Claims, 4 Drawing Sheets

OTHER PUBLICATIONS

Poupyrev, I. et al, "The Go-Go Interaction Technique: Non-Linear Mapping for Direct Manipulation in VR", ACM Symposium on User Interface Software and Technology, 1996, pp. 79-80.

Song, D., M. Norman (1993) "Nonlinear Interactive Motion Control Techniques for Virtual Space Navigation", IEEE Virtual Reality Annual International Symposium (VRAIS), Sep. 18-22, Seattle, Washington, 111117. http://citeseer.nj.nec.com/song93nonlinear.html.

Zaiane, O. and A. Ammoura. 2001. "On-line analytical processing while immersed in a CAVE".

Bowman, D.A., Interaction Techniques for Common Tasks in Immersive Virtual Environments, Georgia Institute of Technology, Jun. 1999.

Bowman, D. Interaction Techniques for Immersive Virtual Environments: Design, Evaluation, and Application. Human-Computer Interaction Consortium (HCIC) Conference, 1998.

Bowman, D. A. and Hodges, L. F. (1997). An evaluation of techniques for grabbing and manipulating remote objects in immersive virtual environments. In 1997 Symposium on Interactive 3D Graphics, pp. 35-38.

Two Pointer Input For 3D Interaction, 1997, Robert C. Zeleznik, Andrew S. Forsberg, Paul S. Strauss, Symposium on Interactive 3D Graphics.

Lindeman, R., J. Sibert, and J. Hahn. Hand-Held Windows: Towards Effective 2D Interaction in Immersive Virtual Environments. IEEE Virtual Reality, 1999.

Bowman, D., Kruijff, E., LaViola, J., and Poupyrev, I. "An Introduction to 3D User Interface Design." Presence: Teleoperators and Virtual Environments, vol. 10, No. 1, 2001, pp. 96-108.

Hultquist, Jeff, "A Virtual Trackball," In Graphics Gems, Andrew S. Glassner (ed.), Academic Press, Inc., San Diego, California, 1990, pp. 462-463.

Kettner, Lutz. "A classification scheme of 3D interaction techniques." Technical Report B95-05, Freie Universitat Berlin, Apr. 1995.

Kwon, Taewook, T. Kim, Y.-C. Choy. 1999. "A new navigation/traveling method in virtual environment." TENCON 99. IEEE Region 10 Conference, vol. 1, 1999. pp. 348-351.

Wartell, Zachary, William Ribarsky, Larry Hodges. 1999. "Third-Person Navigation of Whole-Planet Terrain in a Head-tracked Stereoscopic Environment". 1999 IEEE Virtual Reality Conference (Mar. 13-17, 1999, Houston TX).

Watsen, K., Darken, R., & Capps, M. (1999). "A handheld computer as an interaction device to a virtual environment." Third Immersive Projection Technology Workshop.

Andersen, G. J., Braunstein, M. L. 1985. Induced self-motion in central vision. Journal of Experimental Psychology: Human Perception and Performance II, 122-132.

Daily, M., Howard, M., Jerald, J., Lee, C., Martin, K., McInnes, D., Tinker, P., Smith, R. 2000. Distributed Design Reviews in Virtual Environments. In Proceedings of CVE 2000, San Francisco, CA, Sep. 2000.

Dichgans, J., Brandt, T. 1978. Visual-Vestibular Interaction: Effects of Self-Motion Perception and Postural Control. In Handbook of Sensory Psychology, vol. VIII: Perception, Springer-Verlag, R. Held, H. W. Leibowitz and H. L. Teuber, Eds., Berlin,.

Hettinger, L. J., Riccio, G. E. 1992. Visually Induced Motion Sickness in Virtual Environments. Presence 1, 3, 311-318.

LaViola, J. J. 2000. A Discussion of Cybersickness in Virtual Environments. ACM SIGCHI Bulletin 32, 1, 47-56.

Martin, K. 1999. Creation and Performance Analysis of User Representations in Collaborative Virtual Environments. ACM Computing Surveys Journal. ACM Press.

McCauley, M. E., Sharkey, T. J. 1992. Cybersickness: Perception of Self-Motion in Virtual Environments. Presence 1, 3, 31 1-318.

Parker, D. E., Duh, B. H., Furness, T. A., Prothero, J. D., Seibel, E. J. 2002. Alleviating motion, simulator, and virtual environmental sickness by presenting visual scene components matched to inner ear vestibular sensations. U.S. patent 6,497,649.

Ramey, C. 2000. Boeing Demonstrates Ways to Reduce Joint Strike Fighter Maintenance, Life-Cycle Costs. Boeing Company press release. Jun. 28, 2000. http://www.boeing.com/news/releases/2000/news_release_000628n.htm.

Rensink, R. A., O'Regan, J. K., Clark, J. J. 1997. To See or Not to See: The Need for Attention to Perceive Changes in Scenes. Psychological Science 8, 368-373.

Schunck, G. 1984. The Motion Constraint Equation for Optical Flow. In Proceedings of the International Conference on Pattern Recognition, Montreal, P.O., Canada, 1993, 20-22.

Sharkey, T. J., McCauley, M. E. 1999. The effect of global visual flow on simulator sickness. In Proceedings of the AIAA/AHS Flight Simulation Technologies Conference, American Institute of Aeronautics and Astronautics, Washington, D.C., 496-504.

Sony Computer Entertainment America, Inc. 2003. Playstation. com—Games—EyeToyTM Website (htta;_.(w ww.us.glalyst~tion. 4t~mi mes as ~s_'id,_SC,~ .97319).

UDLP. 2003. United Defense, L.P. Viewgraph package presented at Boeing Missouri Supplier's Conference, Nov. 17, 2003 (http://www.boeing.com/defense-space/ic/fcs/bia/03 1202_mo_briefings/031202_us.pdf), pp. 7.

Delaney, K. J. 2003. Sony Plans to Sell EyeToy in U.S. After Strong Launch. The Wall Street Journal, Aug. 28, 2003.

Pausch, R., Crea, T., Conway, M. 1992. A Literature Survey for Virtual Environments: Military Flight Simulator Visual Systems and Simulator Sickness. Presence 1, 3, 344-363.

* cited by examiner

SYSTEM AND METHOD FOR NAVIGATING OPERATING IN A VIRTUAL ENVIRONMENT

CROSS-REFERENCE TO RELATED APPLICATIONS

The present application claims the benefit of priority of U.S. Provisional Patent Application No. 60/550,808, filed Mar. 5, 2004, and entitled "Method and Apparatus for Interacting with a Virtual Environment."

BACKGROUND OF THE INVENTION (1) Field of the Invention

The present invention relates to a system, method and computer program product for navigating in a virtual environment (VE). More specifically, the present invention relates to navigating large distances in a VE, without becoming disoriented and without becoming cybersick due to exposure to excessive amounts of optical flow.

(2) Description of Related Art

Navigating large distances in a VE provides discomfort to a user. Currently, two commonly used navigation methods are jumping and flying, both are problematic. When jumping, a user often becomes disoriented. While flying preserves the user's orientation, flying exposes the user to optical flow. Optical flow may be defined as the instantaneous velocity of the brightness pattern of an image. It is widely believed that this optical flow can result in the perception of illusory motion, called "vection." Further, vection is one cause of cybersickenss. While the mechanism by which vection causes cybersickness is not understood, it is generally believed that vection contributes to cybersickness due to visual-vestibular sensory conflict. Experiments by Sharkey and McCauley, in "The effect of global visual flow on simulator sickness," in Proceedings of the AIAA/AHS Flight Simulation Technologies Conference, American Institute of Aeronautics and Astronautics, Washington, D.C. 1999, pp. 496-504, showed that higher optical flow rates resulted in significantly higher levels of cybersickness in users.

Optical flow may be defined as the instantaneous velocity of the brightness pattern of an image. Given an image I, the optical flow constraint equation may be written as:

$$-\frac{\delta I}{\delta t} = \left(\frac{\delta I}{\delta x}\right)u + \left(\frac{\delta I}{\delta y}\right)v$$

where x and y are the image coordinates, u and v are the horizontal and vertical components of optical flow and t=time, which was described in G. Schunck, "The Motion Constraint Equation of Optical Flow," in Proceedings of the International Conference on Pattern Recognition, Montreal, Ontario, Canada 1984, p. 20-22. One skilled in the art will appreciate that optical flow may be computed using a variety of techniques, typically by assuming smoothness constraints in the image.

As the magnitude of the optical flow increases, so does the tendency to induce cybersickness, leading to the general approach of minimization of image optical flow to reduce cybersickness. What is needed is a system and method that allows users to move great distances within a VE without becoming disoriented or cybersick. What is needed is a system and method for minimizing optical flow provided to a user.

BRIEF SUMMARY OF THE INVENTION

The present invention provides a system and a method that overcomes the aforementioned limitations and fills the aforementioned needs by combining jumping and flying allow for quick navigation of large distances while preserving a sense of orientation and limiting optical flow.

One aspect of the invention is a method for preventing cybersickness comprising acts of: receiving input from a user; determining a first position and a second position from the input; transitioning a virtual viewpoint of the user from the first position to the second position; and reducing optical flow experienced by the user during the transition.

In a further aspect, the method comprises an act of providing a path marker from the first position to the second position.

In yet a further aspect, the method comprises an act of evaporating a portion of the path marker over a period of time.

In another aspect, the act of reducing optical flow comprises an act of combining acceleration, blanking and deceleration to reduce the optical flow.

In yet another aspect, the act of blanking is selected from a group consisting of: intensity modulation, spatial resolution modulation, and chromatic modulation.

In a further aspect, the act of blanking differs in the user's foveal region.

Another aspect of the present invention is a method for navigating in a virtual environment, the method comprising acts of: defining a starting location; receiving a desired destination in the virtual environment; accelerating a position of a viewpoint toward the desired destination until a velocity threshold is reached, wherein a first transition point is defined when the velocity threshold is reached; changing the position of the viewpoint from the first transition point to a second transition point, where the second transition point between the desired destination and the first transition point; and decelerating the position of the viewpoint from the second transition point to the desired location.

In a further aspect, the method comprises an act of generating a path marker from the starting location to the desired destination.

In another aspect, the act of generating further includes an act of gradually rendering the path marker invisible, where portions of the path marker near the staring location are rendered as invisible before portions of the path marker near the desired location.

In yet another aspect, the method further comprises an act of reducing optical flow provided to a user during the act of changing the position of the viewpoint.

In another aspect, the velocity threshold is based on optical flow to a user.

Another aspect of the present invention is a system for navigating large distances in a virtual environment, the system comprising: an input for receiving data from a tracking subsystem; a graphics processor for receiving data from the tracking subsystem, the graphics processor including: a position module for receiving data from the tracking subsystem, the position module determining: a starting location; and a desired destination in the virtual environment; a transition module for determining: an acceleration factor for moving a position of a viewpoint toward the desired destination; a velocity threshold which when reached defines a first transition point; a second transition point, where the second transition point is between the first transition point and the desired destination, and the position of the viewpoint moves to from the first transition point to the second transition point when the velocity threshold is reached; and a deceleration factor for moving the position of the viewpoint from the second transition point to the desired destination; and an output for outputting the position of the viewpoint at the desired destination and the path marker to a graphics rendering engine to generate a virtual display to be displayed on a display device.

In another aspect, the graphics processor further comprises an optical flow reducer module such that an optical flow provided to a user when the position of the viewpoint is moved from the first transition point to the second transition point is reduced.

In yet another aspect, the velocity threshold is based on an optical flow to a user.

In another aspect, the system further comprises a path marker module for determining: a path marker for showing a trail from the starting location to the desired destination.

In yet another aspect, the path marker is gradually rendered as invisible, where portions of the path marker near the staring location are rendered as invisible before portions of the path marker near the desired location.

Another aspect of the present invention is a computer program product for navigating in a virtual environment, the computer program product usable with a computer system including a processor, a memory coupled with the processor, an input coupled with the processor for receiving data, the computer program product comprising means, stored on a computer readable medium, for: defining a starting location; receiving a desired destination in the virtual environment; accelerating a position of a viewpoint toward the desired destination until a velocity threshold is reached, wherein a first transition point is defined when the velocity threshold is reached; changing the position of the viewpoint from the first transition point to a second transition point, where the second transition point between the desired destination and the first transition point; and decelerating the position of the viewpoint from the second transition point to the desired location.

In another aspect, the computer program product further comprises an act of generating a path marker from the starting location to the desired destination.

In yet another aspect, the act of generating further includes an act of gradually rendering the path marker invisible, where portions of the path marker near the staring location are rendered as invisible before portions of the path marker near the desired location.

In yet another aspect, the computer program product further comprises an act of reducing optical flow provided to a user during the act of changing the position of the viewpoint.

In another aspect, the act of reducing optical flow comprises an act of combining acceleration, blanking and deceleration to reduce the optical flow.

In a further aspect, the act of blanking is selected from a group consisting of: intensity modulation, spatial resolution modulation, and chromatic modulation.

In another aspect, the act of blanking differs in the user's foveal region.

In yet a further aspect, the velocity threshold is based on optical flow to a user.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
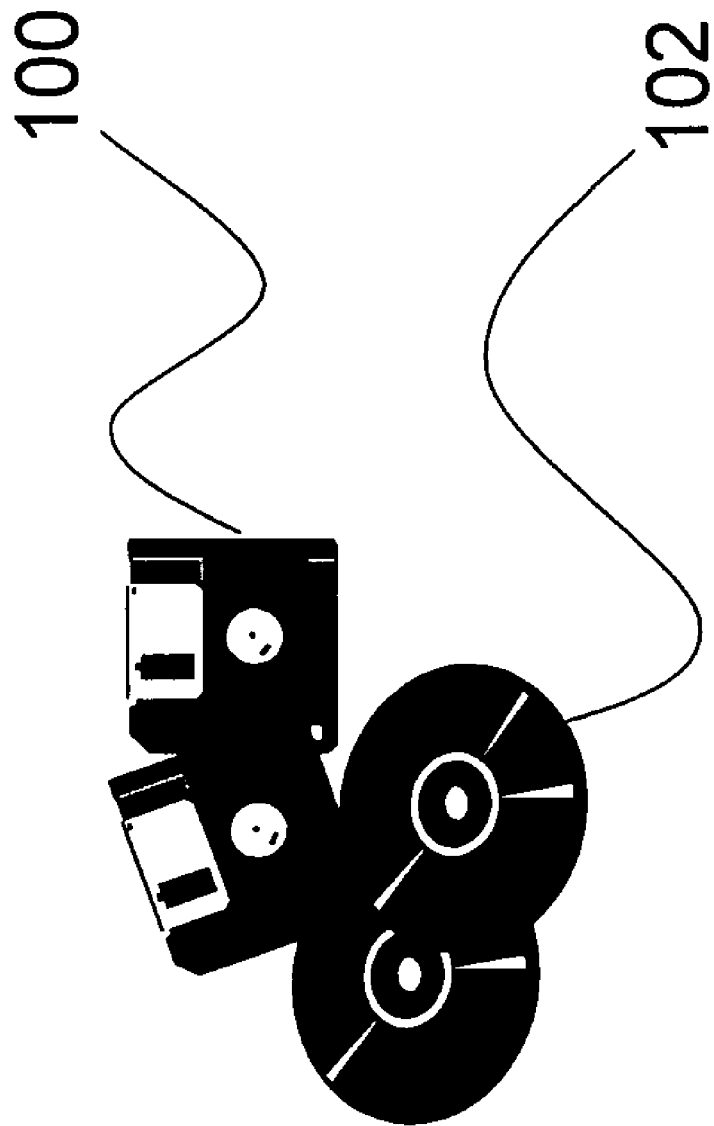
FIG. 1 is an illustrative diagram of a computer program product aspect of the present invention.

The present invention relates to navigating in a virtual environment. More specifically, the present invention relates to combining jumping and flying to allow for quick navigation of large distances while preserving a sense of orientation and limiting optical flow. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

(1) Introduction

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all these, and similar terms, are to be associated with the appropriate physical quantities and are merely convenient labels applied to these quantities. Unless specifically stated otherwise, as apparent from the following discussions, it is appreciated that throughout the present disclosure, discussions utilizing terms such as "processing," "calculating," "extracting," "determining," "inputting," "modeling," "obtaining," "outputting," or "displaying" refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(2) System Overview

The description outlined below sets forth a system and method for navigating in a virtual environment. The disclosed system and method enables a user to move quickly within a modeled world in the virtual environment while preserving a sense of orientation and limiting optical flow.

In one embodiment, the disclosed system and method utilizes a technique, herein referred to as an Anti-Vection Jump, that combines jumping, flying, blanking, and a path marker (i.e., "snail trail") for quick navigation of large distances while preserving a sense of orientation and limiting optical flow. During an Anti-Vection Jump, the viewpoint is gently accelerated toward the destination for several frames to provide the directional context for the movement. At a speed threshold, the scene is optionally faded into a brief "blanking" interval that can comprise of reduced intensity, chromaticity, spatial resolution, or any combination. During blanking, the viewpoint is translated most of the way to the destination. The scene is then faded back to full screen resolution and/or intensity, and the viewpoint is decelerated to the destination point. A "snail trail," which optionally gradually evaporates, marks the path of the movement, so that the user can reestablish orientation by looking back in the direction from which the user came. In addition, the movement during deceleration provides the user with a feel for the direction from which the user came.

(3) Details

The operations performed by the present invention may be encoded as a computer program product. The computer program product generally represents computer readable code stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. An illustrative diagram of a computer program product embodying the present invention is depicted in FIG. 1. The computer program product is depicted as a magnetic disk 100 or an optical disk 102 such as a CD or DVD. However, as mentioned previously, the computer program product generally represents computer-readable code stored on any desirable computer-readable medium.

Figure 2:
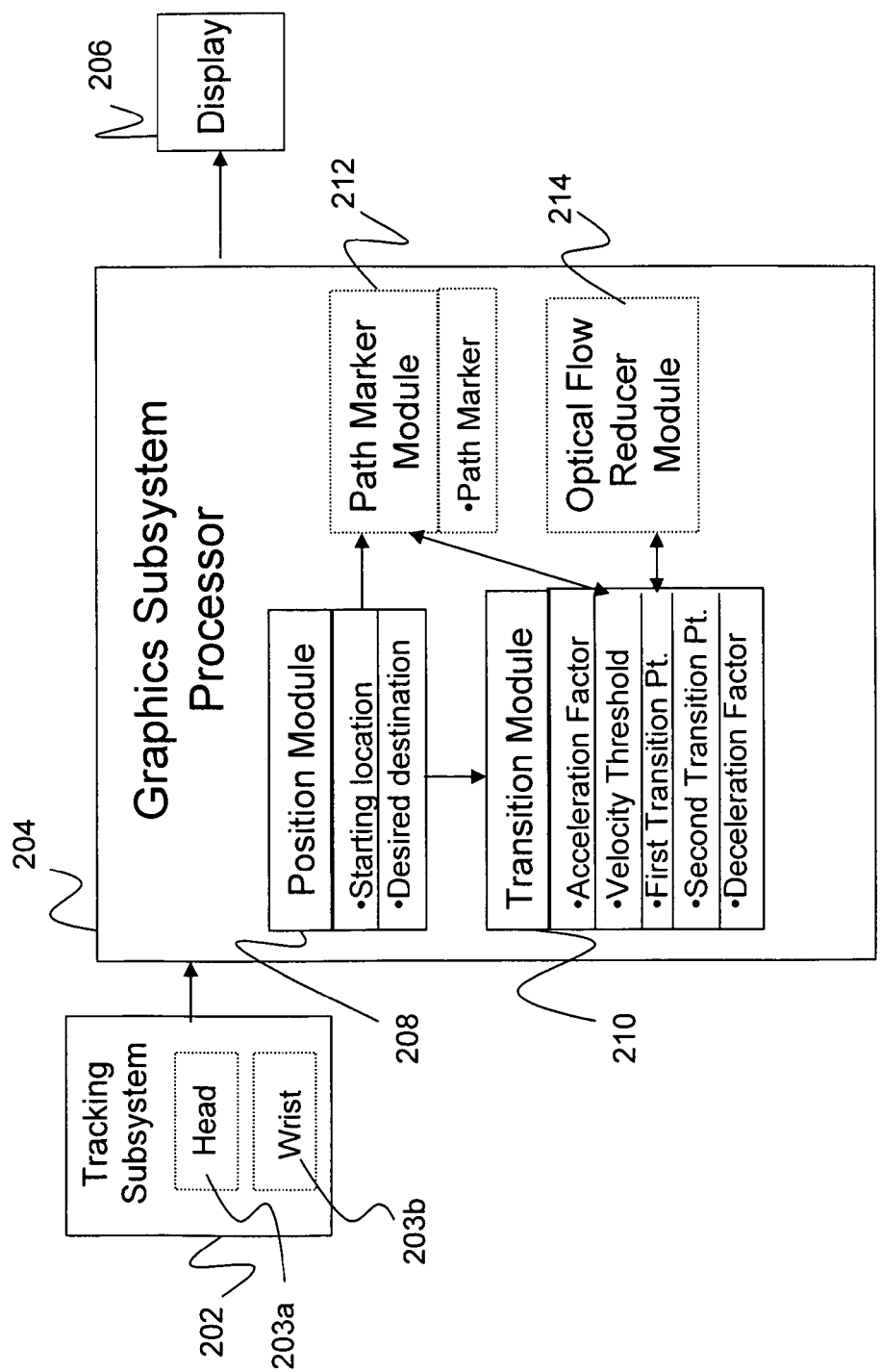
FIG. 2 is block diagram of one embodiment of the present invention.

A block diagram depicting the components of a computer system that may be used in conjunction with the present invention is provided in FIG. 2. The computer system comprises a tracking subsystem 202, a graphics subsystem processor 204 and a display 206. In one embodiment, the computer system is integrated with the navigation capabilities of the virtual environment.

The tracking subsystem 202 comprises sensors, e.g. head sensors 203a and wrist sensors 203b, which allow a user to provide inputs to the graphics subsystem processor 204. One skilled in the art will appreciate that the head sensors 203a and wrist sensors 203b may be replaced with any variety of sensors which allow a user to interact with the graphics subsystem, such as a wand or mouse sensor.

The graphics subsystem processor 204 comprises a position module 208, a transition module 210, an optional path marker module 212, and an optional optical flow reducer module 214.

As depicted in FIG. 2, the position module 208 receives input from the tracking subsystem 202 to determine a starting location and a desired destination within the virtual environment. In one embodiment, the starting point is the current location of the user, and the user selects the desired destination. The position module 208 interacts with the transition module 210.

Figure 3:
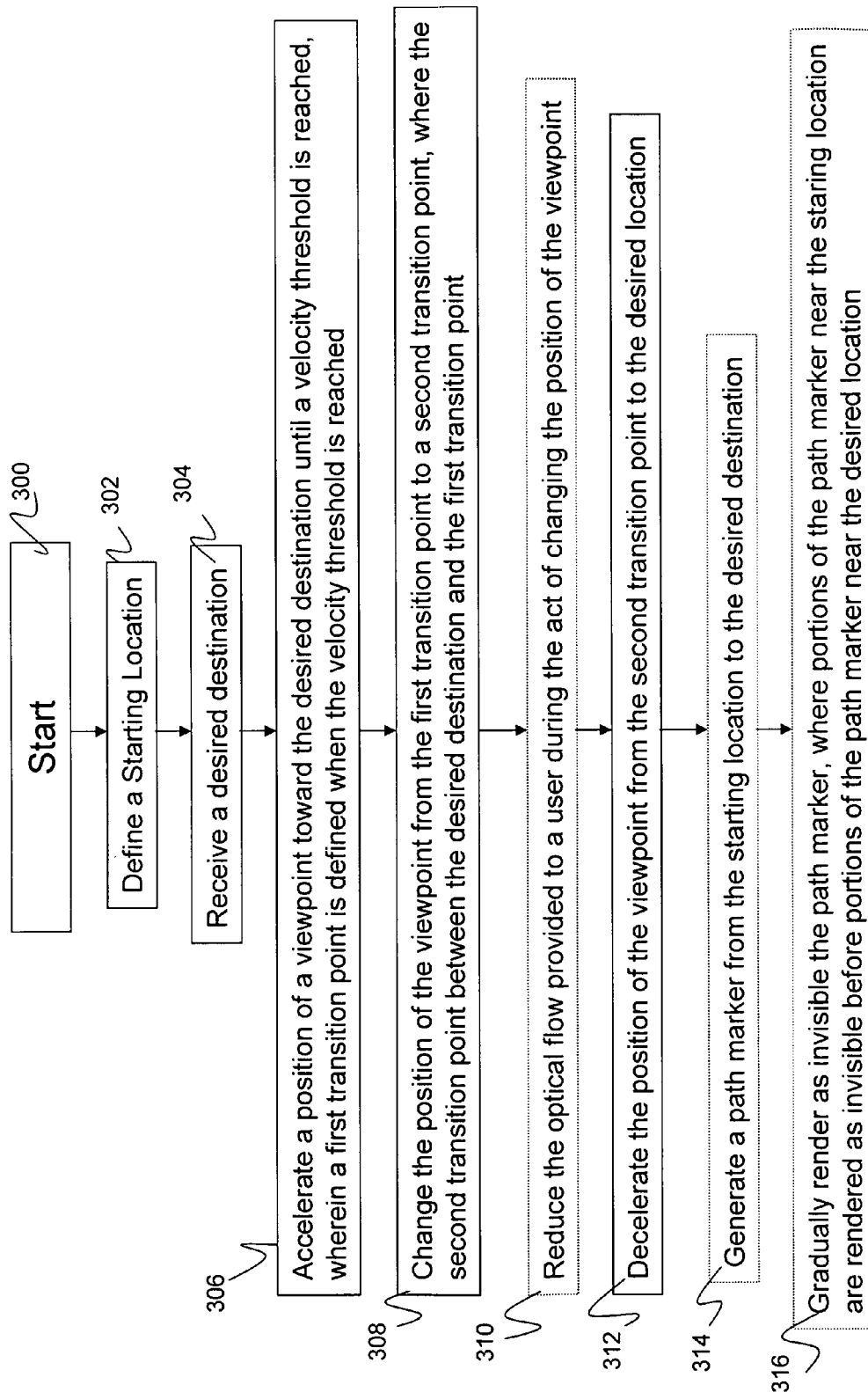
FIG. 3 is a flow diagram of one aspect of the present invention.

The transition module 210 provides the user the ability to move the position of the virtual-viewpoint from the starting location to the desired destination. FIG. 3 is a flow chart illustrating acts performed during the virtual-viewpoint's movement from the starting location to the desired location, according to one embodiment.

As described above with reference to the position module 208 in FIG. 2, after the start 300 of the technique, an act of defining a starting location 302 is first performed. Next, an act of receiving a desired destination 304 is performed. Subsequently, an act of accelerating a position of the virtual-viewpoint 306 according to an acceleration factor, from the starting point to the desired destination, takes place. The acceleration factor is a constant amount of velocity change to be applied to the virtual-viewpoint per unit time. For example, if an acceleration factor of 30 meters/second/second ($m/s^2$) is used in a virtual environment with a 30 frame/second (fps) update rate, after the first frame, the virtual-viewpoint is moving 1 meter/second (m/s) towards the destination. After the second frame, virtual-viewpoint is moving 2 m/s towards the destination, and so on. The user experiences the acceleration by seeing images of the scene moving past the user in the virtual environment, similar to what a person would experience as a plane accelerates for takeoff. The acceleration continues until a velocity threshold is reached.

In one embodiment, the velocity threshold is set based on the optical flow such that the velocity threshold corresponds to when the optical flow provided to the user exceeds a certain threshold. In another embodiment the velocity threshold is determined based on a ratio of the virtual speed of motion to the altitude above the virtual ground. In some experiments, this ratio was found to be correlated to cybersickness. Thus, the velocity threshold is chosen based on the current height of the virtual viewpoint above the virtual ground and the ratio which is correlated to lower instances of cybersickness.

When the velocity threshold is reached a first transition point is defined. In one embodiment, the first transition point corresponds to the location within the virtual environment where the visual-viewpoint is when the velocity threshold is reached.

In one embodiment, the act of changing the position of the virtual-viewpoint to a second transition point 308 is performed next. One method of calculating the second transition point is taking the distance from the starting point to the first transition point, and subtracting that distance from the desired location. The second transition point is located between the first transition point and the desired destination.

In an optional embodiment, the position of the virtual-viewpoint is changed over a period of time, where the optical flow to the user is reduced 310, otherwise known as "blanking." For example, instead of showing the user a first scene corresponding to the first transition point followed by a second scene corresponding to the second transition point, the scene displayed to the user may go dark in between the display of the first scene and the second scene. Optionally, the first scene and the second scene could be merged with reduced resolution, thus the optical flow to the user is reduced.

Once the user is displayed the scene corresponding to the second transition point, the act of decelerating the position of the virtual view-point from the second transition point to the desired destination 312 is then performed, thus giving the user context regarding the direction in which he has traveled in the virtual environment.

Figure 4A:
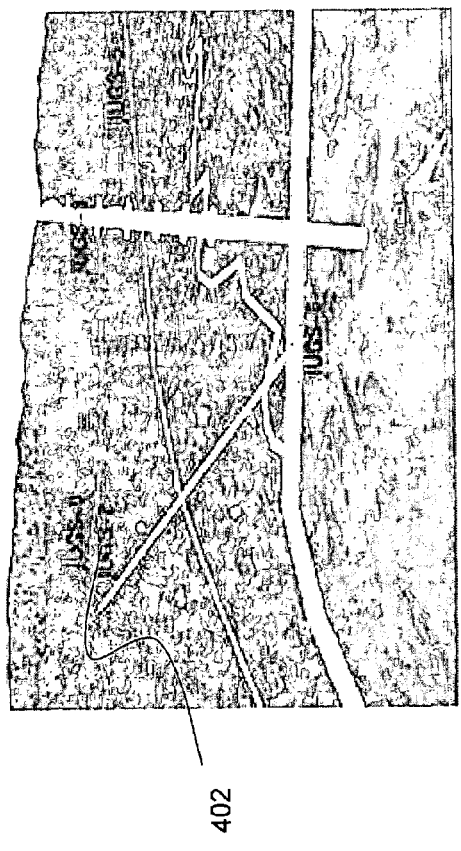
FIGS. 4a and 4b are graphical representations of one embodiment showing a "snail trail."
Figure 4B:
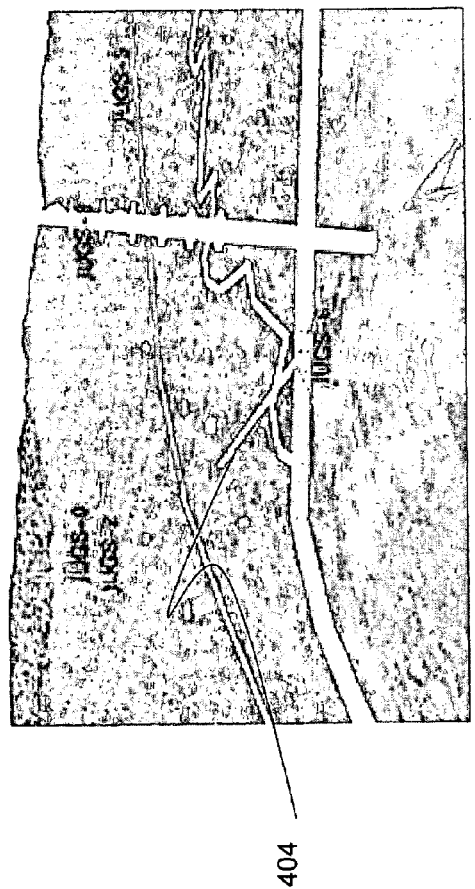

In one embodiment, an optional act of generating a path marker from the starting location to the desired destination 314 is performed so that users can orient themselves relative to the starting position. FIG. 4a depicts a graphical representation of a path marker 402. This trial provides a visual reference back to the initial point, to allow the user to quickly reestablish his or her orientation in a virtual world. In one embodiment, the path marker 402 is implemented using a chain of white, opaque polygons placed at a fixed distance above the terrain, and located on the y-axis (i.e., down) projection of the viewpoint. Optionally, an act of rendering the path marker invisible 316 is performed, such that the path marker evaporates a portion at a time starting at the starting location. Thus, after a given period of time, only a portion of the path marker is visible to the user. FIG. 4b depicts the evaporating path marker 404. In one embodiment, each link in the chain of white, opaque polygons remains in the scene for the same fixed period of time. The result is that the link appears to be evaporating over time. Thus, the path marker 404 is a partially evaporated trail of the path marker 402.

Non-limiting examples of the parameters used to determine how the optical flow will be reduced, i.e. blanking, in act 310 comprise: overall enable, blanking duration, blanking onset slope, blanking decay slope, blanking intensity modification enable, intensity modification depth, resolution modification enable, resolution modification depth, chromatic modification enable, chromatic modification depth, foveal constraint enable, and foveal constraint radius. As previously discussed, the reduction in optical flow, (i.e., blanking), is optional, thus in one embodiment, blanking occurs when the overall enable is active. Blanking duration controls the total duration of the blanking period. Blanking onset slope controls the rate at which the blanking modification is applied, and blanking decay slope controls the rate at which the blanking modification is removed. Each modification enable controls whether that type of modification is included in the blanking period, and the depth values control the extent. Foveal constraint radius defines the radius about the line-of-sight in which the blanking is applied. Most of a human's optical receptors are in the foveal region (i.e, the central 8-10 degrees of the visual field in which spatial resolution is the highest). In order to reduce the optical flow, in one embodiment, the images around the periphery around the foveal region are blurred, thereby reducing the user's perception of optical flow without adversely impacting his ability to see straight ahead.

In one embodiment, jump parameters include the pre-jump acceleration value, post-jump declaration value and the velocity threshold for the jump. The pre-jump acceleration value and the post-jump declaration value are different terms for the acceleration factor described above and operate in the same manner. The velocity threshold can be a set constraint, or can be computed from a direct estimate of optical flow due to velocity. In the experiments by Sharkey and McCauley, referenced in the background, a strong correlation was found between the ratio of the speed of motion to the altitude above the virtual ground and sickness. Thus, in order to reduce cybersickness, a threshold should be set for this ratio at the beginning of the blanking interval.

What is claimed is:

1. A computer implemented method for preventing cybersickness comprising an act of causing a processor to perform operations of:
   receiving input from a user;
   determining a first position and a second position from the input;
   transitioning a virtual viewpoint of the user from the first position to the second position; and
   reducing optical flow experienced by the user during the transition.

2. The method of claim 1, further comprising an operation of providing a path marker from the first position to the second position.

3. The method of claim 2, further comprising an operation of evaporating a portion of the path marker over a period of time.

4. The method of claim 1, wherein the operation of reducing optical flow comprises an operation of combining acceleration, blanking and deceleration to reduce the optical flow.

5. The method of claim 4, wherein the operation of blanking is selected from a group consisting of intensity modulation, spatial resolution modulation, and chromatic modulation.

6. The method of claim 5, wherein the operation of blanking differs in the user's foveal region.

7. A computer implemented method for navigating in a virtual environment, the method comprising an act of causing a processor to perform operations of:
   defining a starting location;
   receiving a desired destination in the virtual environment;
   accelerating a position of a viewpoint toward the desired destination until a velocity threshold is reached, wherein a first transition point is defined when the velocity threshold is reached;
   changing the position of the viewpoint from the first transition point to a second transition point, where the second transition point is between the desired destination and the first transition point; and
   decelerating the position of the viewpoint from the second transition point to the desired location.

8. The method of claim 7, further comprising an operation of generating a path marker from the starting location to the desired destination.

9. The method of claim 8, wherein the operation of generating further includes an operation of gradually rendering the path marker invisible, where portions of the path marker near the staring location are rendered as invisible before portions of the path marker near the desired location.

10. The method of claim 7, further comprising an operation of reducing optical flow provided to a user during the operation of changing the position of the viewpoint.

11. The method of claim 7, wherein the velocity threshold is based on optical flow to a user.

12. A system for navigating large distances in a virtual environment, the system comprising:
  an input for receiving data from a tracking subsystem;
  a graphics processor for receiving data from the tracking subsystem, the graphics processor including:
    a position module for receiving data from the tracking subsystem, the position module determining:
      a starting location; and
      a desired destination in the virtual environment;
    a transition module for determining:
      an acceleration factor for moving a position of a viewpoint toward the desired destination;
      a velocity threshold which when reached defines a first transition point;
      a second transition point, where the second transition point is between the first transition point and the desired destination, and the position of the viewpoint moves to from the first transition point to the second transition point when the velocity threshold is reached; and
      a deceleration factor for moving the position of the viewpoint from the second transition point to the desired destination; and
    an output for outputting the position of the viewpoint at the desired destination and a path marker to a graphics rendering engine to generate a virtual display to be displayed on a display device.

13. The system of claim 12, wherein the graphics processor further comprises an optical flow reducer module such that an optical flow provided to a user when the position of the viewpoint is moved from the first transition point to the second transition point is reduced.

14. The system of claim 12, wherein the velocity threshold is based on an optical flow to a user.

15. The system of claim 12, further comprising a path marker module for determining:
  a path marker for showing a trail from the starting location to the desired destination.

16. The system of claim 15, wherein the path marker is gradually rendered as invisible, where portions of the path marker near the staring location are rendered as invisible before portions of the path marker near the desired location.

17. A computer program product for navigating in a virtual environment, the computer program product usable with a computer system including a processor, a memory coupled with the processor, an input coupled with the processor for receiving data, the computer program product comprising means, stored on a computer readable medium, for:
  defining a starting location;
  receiving a desired destination in the virtual environment;
  accelerating a position of a viewpoint toward the desired destination until a velocity threshold is reached, wherein a first transition point is defined when the velocity threshold is reached;
  changing the position of the viewpoint from the first transition point to a second transition point, where the second transition point is between the desired destination and the first transition point; and
  decelerating the position of the viewpoint from the second transition point to the desired location.

18. The computer program product of claim 17, further comprising an act of generating a path marker from the starting location to the desired destination.

19. The computer program product of claim 18, wherein the act generating further includes an act of gradually rendering the path marker invisible, where portions of the path marker near the staring location are rendered as invisible before portions of the path marker near the desired location.

20. The computer program product of claim 17, further comprising an act of reducing optical flow provided to a user during the act of changing the position of the viewpoint.

21. The computer program product of claim 20, wherein the act of reducing optical flow comprises an act of combining acceleration, blanking and deceleration to reduce the optical flow.

22. The computer program product of claim 21, wherein the act of blanking is selected from a group consisting of: intensity modulation, spatial resolution modulation, and chromatic modulation.

23. The computer program product of claim 22, wherein the act of blanking differs in the user's foveal region.

24. The computer program product of claim 17, wherein the velocity threshold is based on optical flow to a user.

* * * * *